July 14, 1964          S. ZAUGG          3,140,662
GENERATORS FOR THE ELECTRICAL IGNITION OF A PROJECTILE
Filed Oct. 28, 1960
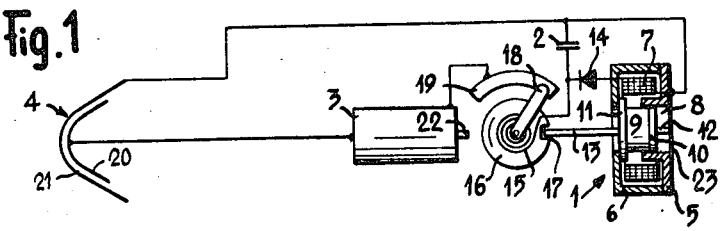
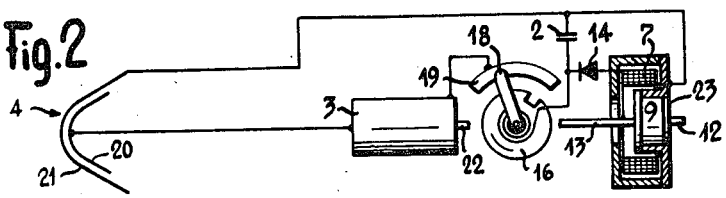
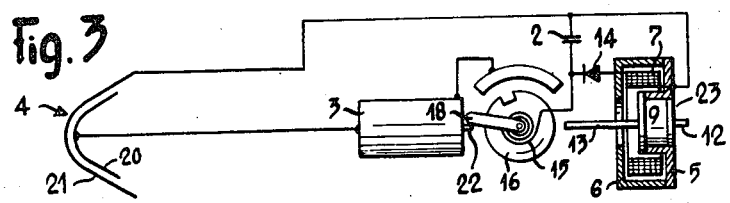
INVENTOR
SAMUEL ZAUGG

United States Patent Office 3,140,662
Patented July 14, 1964

3,140,662
GENERATORS FOR THE ELECTRICAL IGNITION OF A PROJECTILE
Samuel Zaugg, Soleure, Switzerland, assignor to Brevets Aero-Mecaniques S.A., Geneva, Switzerland, a corporation of Switzerland
Filed Oct. 28, 1960, Ser. No. 65,813
Claims priority, application Switzerland Oct. 30, 1959
6 Claims. (Cl. 102—70.2)

Generators for the electric ignition of a projectile are known, comprising a magnetic circuit having a movable core and at least a permanent magnet, a coil being traversed by the magnetic flux of this circuit, the core being adapted to be moved from a first position into a second position relatively to the remainder of the magnetic circuit for provoking a variation of the magnetic flux passing through the coil and inducing a voltage in this latter.

The present invention has for its object a generator of this type characterised in that it comprises a contact short-circuiting the coil when the core occupies its first position, this contact being opened by the core when this passes into its second position.

By reason of this arrangement, the coil is short-circuited during the beginning of the movement of the core, so that the variation of the magnetic flux causes a short-circuit current to circulate in the coil, which current is opposed to this variation of flux. At the moment at which the contact opens, an induced voltage is obtained by reason of the rupture of the current, this voltage being higher than if the coil had not been short-circuited at the beginning of the movement of the core. It thus results that for obtaining a determined voltage, the device, subject of the invention, may have much smaller dimensions than those of known devices.

One form of construction of the generator, subject of the invention, is shown diagrammatically and by way of example in the accompanying drawing, this generator forming part of an electric ignition device for a projectile.

FIGS. 1 to 3 show this generator in three successive positions of operation.

The ignition device comprises a generator 1 adapted to charge a condenser 2 of which the electric energy may be applied to a primer 3 by means of a percussion contactor 4.

The generator 1 comprises a magnetic circuit constituted by two parts 5 and 6 assembled to form a toroidal body containing a coil 7. The internal recess of this toroidal body is of cylindrical shape and contains a movable core 9 constituted by a permanent magnet of cylindrical shape. This magnet is associated with two discs 10 and 11 each having an axial front and rear finger 13 and 12, respectively, and also forming part of the movable core.

One of the terminals of the coil 7 and one of the terminals of the condenser 2 are connected electrically to the part 5 of the magnetic circuit, whilst the other terminal of the coil is connected through the medium of a rectifier 14, to the other terminal of the condenser 2 and to a spiral spring 15 of a control device. This spring is secured to a part 16 insulated relatively to the magnetic circuit. This part 16 is subjected to the action of the spring 15 which tends to cause it to turn in an anti-clockwise direction, but it is prevented from effecting this rotation whilst the end of the finger 13 is engaged in a recess 17 of this part.

The part 16 also carries a conductive finger 18 of which the end is in contact with a metal blade or quadrant 19 connected electrically to the outer casing of the primer 3. It will now be seen that the control device includes parts 15–19 inclusive. This casing is itself connected to a first contact 20 of the percussion contactor 4 of which the second contact 21 is connected electrically to the magnetic circuit. The primer 3 is also provided with a contact terminal 22 and it is constituted in such a manner as to provoke the explosion of the projectile when the charge of the condenser 2 is applied between this terminal 22 and its outer casing.

FIG. 1 represents the generator in the position which it occupies before the departure of the shot. The movable core is in a first position in which the extremity of the finger 13 prevents the rotation of the part 16, on the one hand, whilst the finger 12, which is on its opposite face, bears against a membrane or sheet 23 which forms the bottom of the cylindrical recess 8 of the magnetic circuit. This sheet 23 may, for example, be constituted by the bottom of a casing containing the generator. By reason of the pressure of the finger 12 against the sheet 23, there is obtained a security in transport, as the magnetic core is thus maintained in the position shown in FIG. 1.

FIG. 2 shows the generator in the position which it occupies just after the departure of the shot. Under the action of the initial acceleration of the projectile, the movable core has slid, by inertia, into the recess 8 and its finger 12 has perforated the metallic sheet 23 closing this recess. The thickness of the sheet 23 is selected in such a manner that this latter resists the forces which may be exerted by the finger 12 during the most violent shocks which are liable to be met and provoked during transport, but that it yields under the effort which is produced during the departure of the shot. The finger 13 is withdrawn from the recess 17 in the part 16, so that the coil is no longer short-circuited through the medium of this finger 13, the part 16 and the rectifier 14. At the moment of the rupture of the current of the short-circuit, a voltage is induced in the coil and charges the condenser 2 through the rectifier 14. This latter prevents the condenser then discharging into the coil 7.

During the rotation of the part 16, which may be controlled by any known regulator device, the finger 18 is in contact with the blade 19, in order to obtain a cover or camouflage security. In fact, if the projectile accidentally struck an obstacle when the part 16 is in the position shown in FIG. 2, the closure of the impact contactor 4 would provoke the discharge of the condenser 2 without the energy of this being applied between the casing and the finger of the primer 3.

FIG. 3 shows the generator in its final position, by which the ignition device is ready to function in the case of impact. The part 16 has followed its rotation under the action of the spring 15 until the finger has come into contact with the terminal 22 of the primer. From this moment the closure of the impact contactor 4 provokes the discharge of the condenser 2 into the primer 3 and, consequently, the firing of the projectile.

I claim:
1. A generator for the electric ignition of a projectile, comprising, the combination of,
   a percussion contactor having normally separated first and second contacts,
   a primer conductively connected to said first contact,
   a terminal for said primer,
   a hollow body,
   a coil in said body and having terminals,
   a core in the form of a permanent magnet slidably supported with the coil,
   oppositely disposed front and rear axial fingers on the core,
   a membrane on the body engaged by said rear finger normally to hold the front finger projected from the hollow body,
   a conductive member rotatably mounted relative to the terminal on the primer and having a recess normally receiving the front finger, a conductive arm on said conductive member slidably engaging a conductive quadrant electrically connected with the casing of the primer, a coil spring normally restrained by the front finger engaging the recess and biasing the conductive member toward the primer terminal, an electrical conductor connecting one terminal of the coil with the second contact of the percussion contactor, a rectifier connected with the other terminal of the coil, and a condenser circuit connected with said quadrant, the coil spring, and the conductive arm on the one hand, and the coil on the other hand, whereby, when the core is held against the surface of said membrane, the coil is short-circuited to render the projectile safe for transport, and when the projectile is fired, the inertia of the core causes the rear finger to penetrate the membrane and release the conductive arm to make contact with the terminal on said primer, thereby activating the magnetic circuit so that subsequent impact of the projectile will close said first and second contacts to complete the circuit to the primer.

2. A generator for the electric ignition of a projectile, comprising, the combination of, a hollow body, a coil disposed in said body, a core in the form of a permanent magnet slidably supported in said coil to vary the magnetic flux thereof, a front and rear finger projecting from said core, a membrane on said body, said rear finger normally engaging said membrane to retain said core in an inactive first position, a contact in circuit with said coil to short-circuit said coil when the core is in the first position, said front finger retaining said contact in its short-circuiting position while said core remains in its first position, whereby, when the projectile is fired, the inertia of said core drives said rear finger through said membrane and withdraws said front finger from retaining engagement with said contact to permit transmission of the voltage induced in said coil to a primer in said projectile.

3. A generator for the electric ignition of a projectile comprising, a magnetic circuit, a movable core in the form of a permanent magnet in said circuit, a coil surrounding said magnet, a casing surrounding said coil, said core adapted to be moved from a first position to a second position relatively to the remainder of said magnetic circuit for providing a variation of the magnetic flux passing through said coil and thus inducing a voltage in said coil, one terminal for said coil being electrically connected to said magnetic circuit, and means short-circuiting said coil when said core is in said first position and opening said short circuit through said coil when said core passes into its second position, said means including a contact formed by a conducting finger connected to said core and engageable with a conductive part insulated relatively to said magnetic circuit for electrically connecting said part and said magnetic circuit when the core is in its first position, and for disconnecting said part from said magnetic circuit when said core is in its second position.

4. In a generator for the electric ignition of the primer of a projectile, said primer including a casing, a magnetic circuit including a housing, a coil within said housing and a movable core within said coil, said core adapted to be moved from a first position to a second position relative to the remainder of said circuit for producing a variation in the magnetic flux passing through said coil, said core constituted by a permanent magnet of cylindrical shape adapted to slide in a cylindrical recess formed by the parts constituting the magnetic circuit, the bottom of said recess being closed by a metallic sheet, said core carrying an axial finger disposed to be capable of perforating said metallic sheet and allow said core to pass into said second position, a condenser circuit including a condenser conductively connected with said housing and also adapted to be conductively connected with the said casing of the primer, a rectifier in said condenser circuit and also connected to said coil, and normally closed control means connecting said condenser circuit with the casing of the primer for preventing the premature ignition of the primer, said control means actuated by said core during movement of said core to its second position to open said control means as said core varies the magnetic flux passing through the coil.

5. A generator for the electric ignition of a projectile comprising, a magnetic circuit, a movable core in said circuit, a permanent magnet in said circuit, a coil surrounding said core, said core adapted to be moved from a first position to a second position relatively to the remainder of said magnetic circuit for providing a variation of the magnetic flux passing through said coil and thus inducing a voltage in said coil, contact means operated by movement of said core, said contact means short-circuiting said coil when said core is in said first position and breaking said short-circuit through said coil during movement of said core from its first position into its second position.

6. In a generator for the electric ignition of the primer of a projectile, said primer including a casing, a magnetic circuit including a housing, a coil within said housing and a movable core within said coil said core adapted to be moved from a first position to a second position relative to the remainder of said circuit for producing a variation in the magnetic flux passing through said coil and thus inducing a voltage therein, a condenser circuit including a condenser and a rectifier, said condenser being conductively connected with said coil through said rectifier, and normally closed switching means short-circuiting said condenser for preventing the premature ignition of the primer, said switching means including a conducting finger connected to said core and a conductive part insulated from the magnetic circuit, said switching means actuated by said core during movement of said core to its second position to open said switching means as said core varies the magnetic flux passing through the coil.

References Cited in the file of this patent

UNITED STATES PATENTS

| 2,825,863 | Krupen | Mar. 4, 1958 |
| 2,918,007 | Zaugg | Dec. 22, 1959 |
| 2,966,856 | Tatel | Jan. 3, 1961 |

FOREIGN PATENTS

| 568,542 | Great Britain | Apr. 10, 1945 |
| 331,652 | Switzerland | Sept. 15, 1958 |